(12) United States Patent
Zhang et al.

(10) Patent No.: US 10,841,042 B2
(45) Date of Patent: Nov. 17, 2020

(54) METHOD AND APPARATUS FOR PROVIDING HYBRID AUTOMATIC REPEAT REQUEST (HARQ) TRANSMISSION, TO MEET TRANSMISSIONS REQUIREMENTS OF DIFFERENT SERVICES

(71) Applicant: HUAWEI TECHNOLOGIES CO., LTD., Guangdong (CN)

(72) Inventors: Jinfang Zhang, Beijing (CN); Wei Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/251,960

(22) Filed: Jan. 18, 2019

(65) Prior Publication Data

US 2019/0158231 A1    May 23, 2019

Related U.S. Application Data

(63) Continuation of application No. PCT/CN2017/090373, filed on Jun. 27, 2017.

(30) Foreign Application Priority Data

Jul. 19, 2016  (CN) .......................... 2016 1 0569188

(51) Int. Cl.
*H04L 1/18* (2006.01)
*H04L 1/22* (2006.01)
(Continued)

(52) U.S. Cl.
CPC .......... *H04L 1/1812* (2013.01); *H04L 1/0017* (2013.01); *H04L 1/1896* (2013.01);
(Continued)

(58) Field of Classification Search
CPC ... H04L 1/0017; H04L 1/1812; H04L 1/1896; H04L 1/203; H04L 1/22; H04L 5/0055;
(Continued)

(56) References Cited

U.S. PATENT DOCUMENTS

2008/0008115 A1   1/2008  Farineau et al.
2008/0273520 A1*  11/2008  Kim ........................ H04L 47/78
                                                                370/345
(Continued)

FOREIGN PATENT DOCUMENTS

CN        1996777 A      7/2007
CN      100336332 C      9/2007
(Continued)

OTHER PUBLICATIONS

Extended European Search Report issued in European Application No. 17830338.4 dated Oct. 22, 2019, 13 pages.
(Continued)

*Primary Examiner* — Mewale A Ambaye
(74) *Attorney, Agent, or Firm* — Fish & Richardson P.C.

(57) ABSTRACT

Example HARQ-based transmission methods and apparatus are provided, to meet transmission requirements of different services. In one example method, a network device receives a QoS parameter that is of a service corresponding to a service request and that is delivered by a core network device. The network device determines, based on the QoS parameter of the service, a HARQ configuration parameter corresponding to the service, and notifies the HARQ configuration parameter to the terminal device. Therefore, when different services are transmitted between the network device and the terminal device, different HARQ configuration parameters are configured for different services, and data transmission and retransmission of a service are performed based on a configured HARQ configuration param-
(Continued)

eter, so that transmission requirements of different services can be met.

6 Claims, 8 Drawing Sheets

(51) Int. Cl.
*H04L 1/00* (2006.01)
*H04L 1/20* (2006.01)
*H04L 5/00* (2006.01)

(52) U.S. Cl.
CPC ............... *H04L 1/203* (2013.01); *H04L 1/22* (2013.01); *H04L 5/0055* (2013.01)

(58) Field of Classification Search
CPC ... H04W 28/04; H04W 72/087; H04W 28/24; H04W 74/0841
See application file for complete search history.

(56) References Cited

U.S. PATENT DOCUMENTS

| | | | |
|---|---|---|---|
| 2008/0301514 A1 | 12/2008 | Ma et al. | |
| 2013/0005342 A1* | 1/2013 | Cho | H04W 4/14 455/438 |
| 2013/0223282 A1* | 8/2013 | Zhang | H04W 76/15 370/254 |
| 2013/0223344 A1* | 8/2013 | Sun | H04L 1/1822 370/328 |
| 2015/0172023 A1* | 6/2015 | Yang | H04L 1/1671 370/329 |
| 2015/0195850 A1* | 7/2015 | Quan | H04L 1/18 370/329 |
| 2017/0099118 A1* | 4/2017 | Negalaguli | H04L 1/0026 |
| 2017/0164231 A1 | 6/2017 | Quan et al. | |

FOREIGN PATENT DOCUMENTS

| | | | |
|---|---|---|---|
| CN | 101272315 A | | 9/2008 |
| CN | 101282204 A | | 10/2008 |
| CN | 101414899 A | | 4/2009 |
| CN | 102333344 A | | 1/2012 |
| CN | 102892145 A | | 1/2013 |
| CN | 104137457 A | | 11/2014 |
| CN | 104486793 A | | 4/2015 |
| CN | 104901782 A | | 9/2015 |
| EP | 1796415 A2 | | 6/2007 |
| EP | 2645785 | * | 2/2012 |
| EP | 2645785 A1 | | 10/2013 |
| WO | 2015152787 A1 | | 10/2015 |
| WO | 2016029737 A1 | | 3/2016 |

OTHER PUBLICATIONS

Partial Supplementary European Search Report issued in European Application No. 17830338.4 dated Jun. 24, 2019, 7 pages.
International Search Report and Written Opinion issued in International Application No. PCT/CN2017/090373 dated Aug. 29, 2017, 18 pages.
Office Action issued in Chinese Application No. 201610569188.0 dated May 29, 2020, 16 pages (with English translation).

* cited by examiner

METHOD AND APPARATUS FOR PROVIDING HYBRID AUTOMATIC REPEAT REQUEST (HARQ) TRANSMISSION, TO MEET TRANSMISSIONS REQUIREMENTS OF DIFFERENT SERVICES

CROSS-REFERENCE TO RELATED APPLICATIONS

This application is a continuation of International Application No. PCT/CN2017/090373, filed on Jun. 27, 2017, which claims priority to Chinese Patent Application No. 201610569188.0, filed on Jul. 19, 2016. The disclosures of the aforementioned applications are hereby incorporated by reference in their entireties.

TECHNICAL FIELD

The present invention relates to the field of wireless technologies, and in particular, to a HARQ-based transmission method and apparatus.

BACKGROUND

A hybrid automatic repeat request (Hybrid Automatic Repeat Request, HARQ) technology is a technology integrating forward error correction (Forward Error Correction, FEC) and automatic repeat request (Automatic Repeat Request, ARQ). In the FEC, some errors can be corrected at a receive end by adding redundant information, to reduce a quantity of retransmission times. For an error that cannot be corrected by using FEC, the receive end requests a transmit end to retransmit data by using an ARQ mechanism. In the HARQ technology, data transmission and fast retransmission are implemented by separately maintaining a HARQ entity at Media Access Control (Media Access Control, MAC) sublayers of two communications ends, namely, a terminal device side and a base station side.

As shown in FIG. 1, for service data sent by each terminal device by using different logical channels, after the service data is scheduled by a scheduler and priority processing is performed on the service data, data multiplexing is implemented at a MAC sublayer at a terminal device granularity. In other words, data of one terminal device on all logical channels is multiplexed into one transport block. In a spatial multiplexing scenario, data of one terminal device on all logical channels may be multiplexed into a plurality of transport blocks, and then the transport blocks are sent to a HARQ entity for transmission and fast retransmission on a transport channel. Because multiplexing is implemented at the MAC sublayer at the terminal device granularity, parameter configuration for a HARQ entity in an LTE system is also implemented at the terminal device granularity, without distinguishing between different transmission requirements of different service data of the terminal device.

A Next Generation Mobile Network (Next Generation Mobile Network, NGMN), for example, a future 5G mobile communications system, further needs to support various new services with different requirements in addition to a conventional mobile broadband (Mobile Broadband, MBB) service. In the NGMN, future services are roughly divided into an enhanced MBB (enhanced MBB, eMBB) service, a massive machine type communications (massive Machine Type Communications, mMTC) service, and an ultra-reliable and low latency communications (Ultra-Reliable and Low Latency Communications, URLLC) service. These services impose different requirements on a network. For example, the eMBB service requires the network to provide large bandwidth and a low latency, the mMTC service is insensitive to a latency and requires the network to provide an ultra large quantity of connections, and the URLLC service requires the network to provide extremely high reliability and an extremely low end-to-end latency. To meet different requirements of these services, the network needs to differently process these services in terms of network functions, protocol stacks, procedures, parameter configuration, and the like. If the network still uses one processing mechanism, for example, if the network multiplexes service data at a MAC sublayer without distinguishing, and performs data transmission and fast retransmission by using a single HARQ configuration parameter, service requirements possibly cannot be met.

Therefore, if a same HARQ configuration parameter is set for services with different transmission requirements, transmission latency requirements of different services cannot be met, and therefore a HARQ-based transmission solution is required urgently to meet transmission latency requirements of different services.

SUMMARY

Embodiments of the present invention provide a HARQ-based transmission method and apparatus, to meet transmission requirements of different services.

Specific technical solutions provided in the embodiments of the present invention are as follows:

According to a first aspect, a HARQ-based transmission method is provided, including:

receiving, by a network device, a QoS parameter that is of a service corresponding to a service request and that is delivered by a core network device;

determining, by the network device based on the QoS parameter of the service, a HARQ configuration parameter corresponding to the service; and notifying, by the network device, the HARQ configuration parameter to the terminal device.

Therefore, when the service corresponding to the service request is transmitted between the network device and the terminal device, different HARQ configuration parameters are configured for different services, and data transmission and retransmission of the service are performed based on the configured HARQ configuration parameter, so that transmission requirements of different services can be met.

With reference to the first aspect, in a possible design, the HARQ configuration parameter includes a maximum quantity of HARQ retransmission times.

With reference to the first aspect, in a possible design, the HARQ configuration parameter includes an ACK/NACK feedback time.

With reference to the first aspect, in a possible design, before the receiving, by a network device, a QoS parameter that is of a service corresponding to a service request and that is delivered by a core network device, the method further includes:

receiving, by the network device, the service request sent by the terminal device; and sending, by the network device, the service request of the terminal device to the core network device.

With reference to the first aspect, in a possible design, after the receiving, by a network device, a QoS parameter that is of a service corresponding to a service request and that is delivered by a core network device, and before the determining a HARQ configuration parameter corresponding to the service, the method further includes:

determining, by the network device based on the QoS parameter of the service, a first radio interface technology for bearing the service; and notifying, by the network device, the terminal device to use the first radio interface technology to transmit data corresponding to the service.

With reference to the first aspect, in a possible design, the determining, by the network device based on the QoS parameter of the service, a HARQ configuration parameter corresponding to the service includes:

when no service bearer of the terminal device has been set up on the first radio interface technology, determining, based on the QoS parameter of the service, the HARQ configuration parameter corresponding to the service.

In this design, in a scenario in which service transmission is performed between the network device and the terminal device by using a plurality of radio interface technologies, services with different transmission requirements are borne on different radio interface technologies, and different HARQ configuration parameters are configured for services transmitted on different radio interface technologies, so that transmission requirements of different services can be met.

With reference to the first aspect, in a possible design, after the notifying, by the network device, the HARQ configuration parameter to the terminal device, the method further includes:

obtaining, by the network device for the terminal device, a data packet from a bearer that is the same as the HARQ configuration parameter, to perform transmission multiplexing to generate a transport block; and performing data transmission and retransmission based on the HARQ configuration parameter.

In this design, when different services are transmitted, a HARQ configuration parameter needs to be configured for each time of bearer setup of a new service. In the prior art, the HARQ configuration parameter is configured at a terminal device granularity, to be specific, a same HARQ configuration parameter is used regardless of a service type, and therefore different HARQ configuration parameters cannot be configured for different services. Compared with the prior art, by using the foregoing design, HARQ configuration parameters can be configured for services with different transmission requirements, so that transmission requirements of different services can be met.

According to a second aspect, a HARQ-based transmission method is provided, including:

sending, by a terminal device, a service request to a core network device by using a network device;

receiving, by the terminal device, a HARQ configuration parameter that is configured for a service of the service request and that is sent by the network device; and configuring, by the terminal device, the HARQ configuration parameter for the service of the service request, and performing data transmission and retransmission with the network device based on the HARQ configuration parameter.

Therefore, when the terminal device needs to transmit a service corresponding to an attach request or the service request, the terminal device can configure different HARQ configuration parameters for different services based on the network device, and perform data transmission and retransmission of the service with the network device, to meet transmission requirements of different services.

With reference to the second aspect, in a possible design, after the sending, by a terminal device, a service request to a core network device by using a network device, and before the receiving a HARQ configuration parameter that is configured for a service of the service request and that is sent by the network device, the method further includes:

receiving, by the terminal device, radio interface technology indication information sent by the network device, where the radio interface technology indication information is used to indicate a first radio interface technology that needs to be used by the terminal device to transmit the service of the service request.

In this design, services with different transmission requirements can be borne on different radio interface technologies, to meet transmission requirements of different services.

With reference to the second aspect, in a possible design, the receiving, by the terminal device, a HARQ configuration parameter that is configured for a service of the service request and that is sent by the network device includes:

when no service bearer of the terminal device has been set up on the first radio interface technology, receiving, by the terminal device, the HARQ configuration parameter that is configured for the service of the service request and that is sent by the network device; or when a service bearer of the terminal device has been set up on the first radio interface technology, skipping receiving, by the terminal device, the HARQ configuration parameter.

In this design, different HARQ configuration parameters are configured for different radio interface technologies, so that transmission requirements of different services can be met.

According to a third aspect, a HARQ-based transmission method is provided, including:

receiving, by a network device, a QoS parameter that is of a service corresponding to an attach request and that is delivered by a core network device;

determining, by the network device based on the QoS parameter of the service, a HARQ configuration parameter corresponding to the service; and notifying, by the network device, the HARQ configuration parameter to the terminal device.

Therefore, when the service corresponding to the attach request is transmitted between the network device and the terminal device, different HARQ configuration parameters are configured for different services, and data transmission and retransmission of the service are performed based on the configured HARQ configuration parameter, so that transmission requirements of different services can be met.

With reference to the third aspect, in a possible design, the HARQ configuration parameter includes a maximum quantity of HARQ retransmission times.

With reference to the third aspect, in a possible design, the HARQ configuration parameter includes an ACK/NACK feedback time.

With reference to the third aspect, in a possible design, before the receiving, by a network device, a QoS parameter that is of a service corresponding to an attach request and that is delivered by a core network device, the method further includes:

receiving, by the network device, the attach request sent by the terminal device; and sending, by the network device, the attach request of the terminal device to the core network device.

With reference to the third aspect, in a possible design, after the receiving, by a network device, a QoS parameter that is of a service corresponding to an attach request and that is delivered by a core network device, and before the determining a HARQ configuration parameter corresponding to the service, the method further includes:

determining, by the network device based on the QoS parameter of the service, a first radio interface technology for bearing the service; and notifying, by the network device, the terminal device to use the first radio interface technology to transmit data corresponding to the service.

With reference to the third aspect, in a possible design, the determining, by the network device based on the QoS parameter of the service, a HARQ configuration parameter corresponding to the service includes:

when no service bearer of the terminal device has been set up on the first radio interface technology, determining, based on the QoS parameter of the service, the HARQ configuration parameter corresponding to the service.

In this design, in a scenario in which service transmission is performed between the network device and the terminal device by using a plurality of radio interface technologies, services with different transmission requirements are borne on different radio interface technologies, and different HARQ configuration parameters are configured for services transmitted on different radio interface technologies, so that transmission requirements of different services can be met.

With reference to the third aspect, in a possible design, after the notifying, by the network device, the HARQ configuration parameter to the terminal device, the method further includes:

obtaining, by the network device for the terminal device, a data packet from a bearer that is the same as the HARQ configuration parameter, to perform transmission multiplexing to generate a transport block; and performing data transmission and retransmission based on the HARQ configuration parameter.

In this design, when different services are transmitted, a HARQ configuration parameter needs to be configured for each time of bearer setup of a new service. In the prior art, the HARQ configuration parameter is configured at a terminal device granularity, to be specific, the terminal device needs to configure the HARQ configuration parameter only once in a bearer setup/re-setup/reconfiguration process, and does not need to configure the HARQ configuration parameter once for each time of setup of a new bearer. Compared with the prior art, by using the foregoing design, HARQ configuration parameters can be configured for services with different transmission requirements, to meet latency requirements of different services, improve service transmission quality, and meet user requirements.

According to a fourth aspect, a HARQ-based transmission method is provided, including:

sending, by a terminal device, an attach request to a core network device by using a network device;

receiving, by the terminal device, a HARQ configuration parameter that is configured for a service of the attach request and that is sent by the network device; and configuring, by the terminal device, the HARQ configuration parameter for the service of the attach request, and performing data transmission and retransmission with the network device based on the HARQ configuration parameter.

Therefore, when the terminal device needs to transmit the service corresponding to the attach request, the terminal device can configure different HARQ configuration parameters for different services based on the network device, and perform data transmission and retransmission of the service with the network device, to meet transmission requirements of different services.

With reference to the fourth aspect, in a possible design, after the sending, by a terminal device, an attach request to a core network device by using a network device, and before the receiving a HARQ configuration parameter that is configured for a service of the attach request and that is sent by the network device, the method further includes:

receiving, by the terminal device, radio interface technology indication information sent by the network device, where the radio interface technology indication information is used to indicate a first radio interface technology that needs to be used by the terminal device to transmit the service of the attach request.

With reference to the fourth aspect, in a possible design, the receiving, by the terminal device, a HARQ configuration parameter that is configured for a service of the attach request and that is sent by the network device includes:

when no service bearer of the terminal device has been set up on the first radio interface technology, receiving, by the terminal device, the HARQ configuration parameter that is configured for the service of the attach request and that is sent by the network device; or when a service bearer of the terminal device has been set up on the first radio interface technology, skipping receiving, by the terminal device, the HARQ configuration parameter.

According to a fifth aspect, a HARQ-based transmission apparatus is provided, including:

a receiving unit, configured to receive a quality of service QoS parameter that is of a service corresponding to a service request and that is delivered by a core network device;

a processing unit, configured to determine, based on the QoS parameter of the service, a HARQ configuration parameter corresponding to the service; and a sending unit, configured to notify the HARQ configuration parameter to the terminal device.

With reference to the fifth aspect, in a possible design, the HARQ configuration parameter includes a maximum quantity of HARQ retransmission times.

With reference to the fifth aspect, in a possible design, the HARQ configuration parameter includes an ACK/NACK feedback time.

With reference to the fifth aspect, in a possible design, the receiving unit is further configured to:

before receiving the QoS parameter that is of the service corresponding to the service request and that is delivered by the core network device, receive the service request sent by the terminal device; and the sending unit is further configured to send the service request of the terminal device to the core network device.

With reference to the fifth aspect, in a possible design, the processing unit is further configured to:

after the receiving unit receives the QoS parameter that is of the service corresponding to the service request and that is delivered by the core network device, and before the processing unit determines the HARQ configuration parameter corresponding to the service, determine, based on the QoS parameter of the service, a first radio interface technology for bearing the service; and the sending unit is further configured to notify the terminal device to use the first radio interface technology to transmit data corresponding to the service.

With reference to the fifth aspect, in a possible design, when determining, based on the QoS parameter of the service, the HARQ configuration parameter corresponding to the service, the processing unit is specifically configured to:

when no service bearer of the terminal device has been set up on the first radio interface technology, determine, based on the QoS parameter of the service, the HARQ configuration parameter corresponding to the service.

With reference to the fifth aspect, in a possible design, the processing unit is further configured to:

after the sending unit notifies the HARQ configuration parameter to the terminal device, obtain, for the terminal device, a data packet from a bearer that is the same as the HARQ configuration parameter, to perform transmission multiplexing to generate a transport block; and perform data transmission and retransmission based on the HARQ configuration parameter.

According to a sixth aspect, a HARQ-based transmission apparatus is provided, including:

a sending unit, configured to send a service request to a core network device by using a network device;

a receiving unit, configured to receive a HARQ configuration parameter that is configured for a service of the service request and that is sent by the network device; and a processing unit, configured to: configure the HARQ configuration parameter for the service of the service request, and perform data transmission and retransmission with the network device based on the HARQ configuration parameter.

With reference to the sixth aspect, in a possible design, the receiving unit is further configured to:

after the sending unit sends the service request to the core network device by using the network device, and before the receiving unit receives the HARQ configuration parameter that is configured for the service of the service request and that is sent by the network device, receive radio interface technology indication information sent by the network device, where the radio interface technology indication information is used to indicate a first radio interface technology that needs to be used by the terminal device to transmit the service of the service request.

With reference to the fifth aspect, in a possible design, when receiving the HARQ configuration parameter that is configured for the service of the service request and that is sent by the network device, the receiving unit is specifically configured to:

when no service bearer of the terminal device has been set up on the first radio interface technology, receive the HARQ configuration parameter that is configured for the service of the service request and that is sent by the network device; or when a service bearer of the terminal device has been set up on the first radio interface technology, skip receiving the HARQ configuration parameter.

According to a seventh aspect, a HARQ-based transmission apparatus is provided, including:

a receiving unit, configured to receive a quality of service QoS parameter that is of a service corresponding to an attach request and that is delivered by a core network device;

a processing unit, configured to determine, based on the QoS parameter of the service, a HARQ configuration parameter corresponding to the service; and a sending unit, configured to notify the HARQ configuration parameter to the terminal device.

With reference to the seventh aspect, in a possible design, the HARQ configuration parameter includes a maximum quantity of HARQ retransmission times.

With reference to the seventh aspect, in a possible design, the HARQ configuration parameter includes an ACK/NACK feedback time.

With reference to the seventh aspect, in a possible design, the receiving unit is further configured to:

before receiving the QoS parameter that is of the service corresponding to the attach request and that is delivered by the core network device, receive the attach request sent by the terminal device; and the sending unit is further configured to send the attach request of the terminal device to the core network device.

With reference to the seventh aspect, in a possible design, the processing unit is further configured to:

after the receiving unit receives the QoS parameter that is of the service corresponding to the attach request and that is delivered by the core network device, and before the processing unit determines the HARQ configuration parameter corresponding to the service, determine, based on the QoS parameter of the service, a first radio interface technology for bearing the service; and the sending unit is further configured to notify the terminal device to use the first radio interface technology to transmit data corresponding to the service.

With reference to the seventh aspect, in a possible design, when determining, based on the QoS parameter of the service, the HARQ configuration parameter corresponding to the service, the processing unit is specifically configured to:

when no service bearer of the terminal device has been set up on the first radio interface technology, determine, based on the QoS parameter of the service, the HARQ configuration parameter corresponding to the service.

With reference to the seventh aspect, in a possible design, the processing unit is further configured to:

after the sending unit notifies the HARQ configuration parameter to the terminal device, obtain, for the terminal device, a data packet from a bearer that is the same as the HARQ configuration parameter, to perform transmission multiplexing to generate a transport block; and perform data transmission and retransmission based on the HARQ configuration parameter.

According to an eighth aspect, a HARQ-based transmission apparatus is provided, including:

a sending unit, configured to send an attach request to a core network device by using a network device;

a receiving unit, configured to receive a HARQ configuration parameter that is configured for a service of the attach request and that is sent by the network device; and a processing unit, configured to: configure the HARQ configuration parameter for the service of the attach request, and perform data transmission and retransmission with the network device based on the HARQ configuration parameter.

With reference to the eighth aspect, in a possible design, the receiving unit is further configured to:

after the sending unit sends the attach request to the core network device by using the network device, and before the receiving unit receives the HARQ configuration parameter that is configured for the service of the attach request and that is sent by the network device, receive radio interface technology indication information sent by the network device, where the radio interface technology indication information is used to indicate a first radio interface technology that needs to be used by the terminal device to transmit the service of the attach request.

With reference to the eighth aspect, in a possible design, when receiving the HARQ configuration parameter that is configured for the service of the attach request and that is sent by the network device, the receiving unit is specifically configured to:

when no service bearer of the terminal device has been set up on the first radio interface technology, receive the HARQ configuration parameter that is configured for the service of the attach request and that is sent by the network device; or when a service bearer of the terminal device has been set up on the first radio interface technology, skip receiving the HARQ configuration parameter.

According to a ninth aspect, a terminal device is provided. The terminal device has a function of implementing behavior of the terminal device according to any one of the foregoing aspects and possible designs. The function may be implemented by using hardware, or may be implemented by using hardware by executing corresponding software. The hardware or the software includes one or more modules corresponding to the function.

In a possible design, a structure of the terminal device includes a transceiver, a memory, and a processor. The memory is configured to store a group of programs, and the processor is configured to invoke the programs stored in the memory, to perform the method according to any one of the foregoing aspects and designs. Therefore, when different services are transmitted between a network device and the terminal device, different HARQ configuration parameters are configured for different services, and data transmission and retransmission of a service are performed based on a configured HARQ configuration parameter, so that transmission requirements of different services can be met.

According to a tenth aspect, a network device is provided. The network device has a function of implementing behavior of the network device according to any one of the foregoing aspects and possible designs. The function may be implemented by using hardware, or may be implemented by using hardware by executing corresponding software. The hardware or the software includes one or more modules corresponding to the function.

In a possible design, a structure of the network device includes a transceiver, a memory, and a processor. The memory is configured to store a group of programs, and the processor is configured to invoke the programs stored in the memory, to perform the method according to any one of the foregoing aspects and designs. Therefore, when different services are transmitted between the network device and a terminal device, different HARQ configuration parameters are configured for different services, and data transmission and retransmission of a service are performed based on a configured HARQ configuration parameter, so that transmission requirements of different services can be met.

Different from the prior art, in the HARQ-based transmission solution provided in the embodiments of the present invention, different HARQ configuration parameters are configured for different services, to meet different transmission requirements of different services. Compared with the prior art in which the HARQ configuration parameter is configured at a terminal device granularity, in the present invention, HARQ configuration is associated with a service, so that services can be processed differently at a MAC sublayer, to meet transmission requirements such as latency requirements, rate requirements, and priority requirements of different services.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

It should be noted that a bearer in the embodiments of the present invention may include an end-to-end bearer, for example, a radio bearer (radio bearer).

Figure 1:
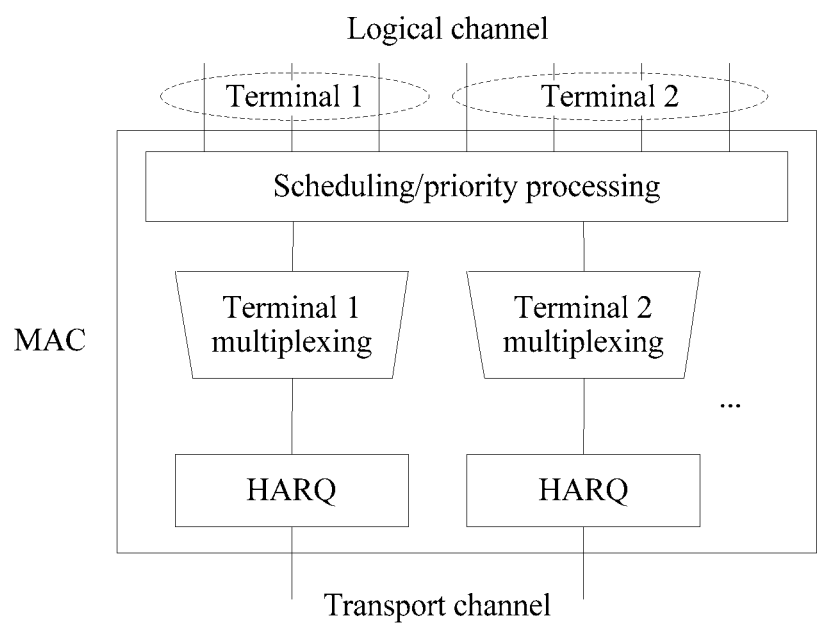
FIG. 1 is a schematic diagram of existing channel transmission.
Figure 2:
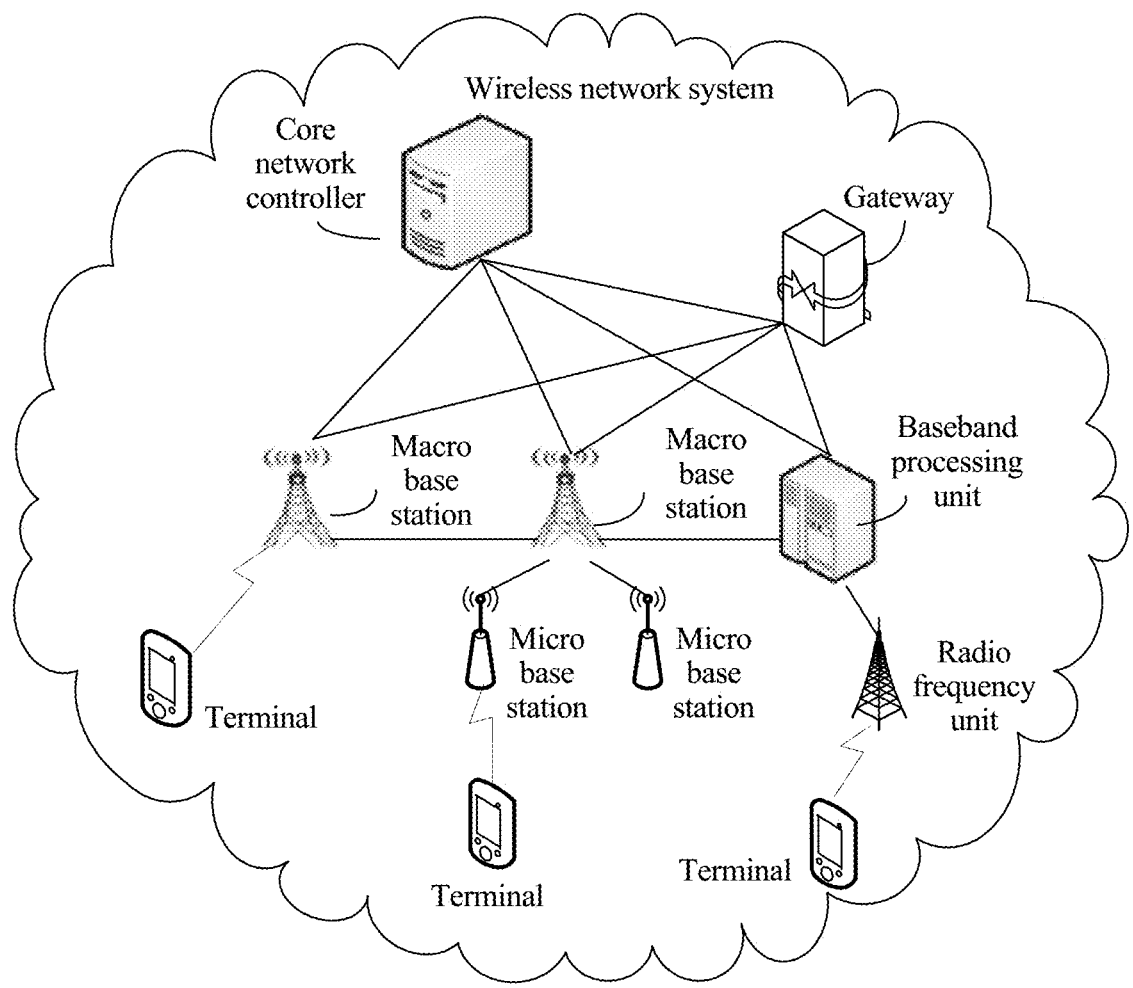
FIG. 2 is a schematic architectural diagram of a communications system according to an embodiment of the present invention.

An applied communications system architecture provided in the embodiments includes a core network controller, a network device, and a terminal device. The core network controller is mainly configured to: provide a user with various functions such as session management, mobility management, bearer management, and handover management, and also provide a policy and charging control function and a subscription server function; and support service data transmission in a plurality of PS domains, and support multi-service bearing of a same terminal device. The network device is configured to implement various access functions, including radio interface technology processing, core network transmission processing, and the like. In a system architectural diagram shown in FIG. 2, the network device may be a conventional macro base station in a conventional UMTS/LTE wireless communications system, may be a micro base station in a heterogeneous network (Heterogeneous Network, HetNet) scenario, may be a baseband processing unit and a radio frequency unit in a new radio access network architecture (C-RAN) scenario, or may be a next generation NodeB (next generation NodeB, gNB) in a future evolved wireless communications system. Correspondingly, HARQ on a network side may be deployed on the macro base station, the micro base station, the baseband processing unit, or the gNB. It should be noted that in a wireless communications network system shown in FIG. 2, the network devices may coexist, or may not coexist and only some network devices exist.

Figure 3:
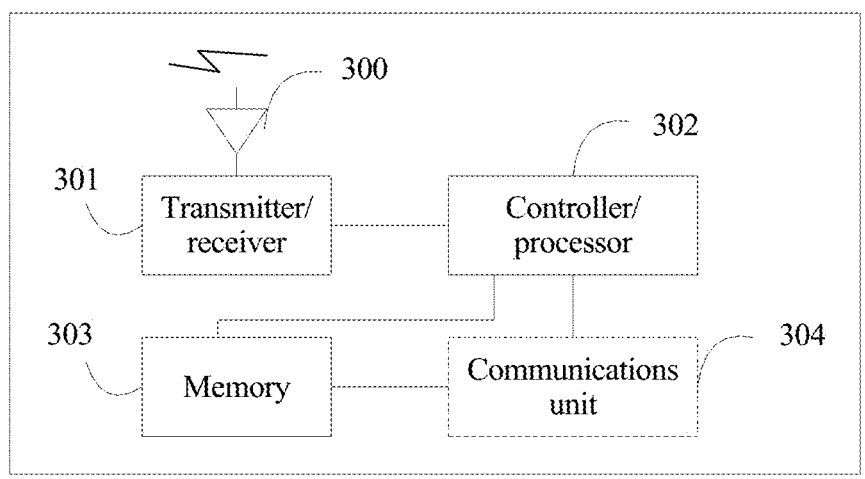
FIG. 3 is a schematic structural diagram of a network device according to an embodiment of the present invention.

As shown in FIG. 3, a network device includes an antenna 300, a transmitter/receiver 301, a controller/processor 302, and a memory 303. The transmitter/receiver 301 is configured to: support information sending/receiving between the network device and a terminal device, and support radio communication between the network device and another network device; and can further implement data processing functions such as HARQ transmission and fast retransmission functions at a MAC layer and a physical layer. The controller/processor 302 implements various control functions for communication with the terminal device, and completes various types of control logic such as radio resource management (Radio Resource Management, RRM), radio resource control (Radio Resource Control, RRC), mobility management, parameter decision, and parameter configuration. Specifically, in the embodiments of the present invention, the controller/processor 302 determines, based on received quality of service (Quality of Service, QoS) information of a service, a HARQ configuration parameter for processing data on a bearer of the service, for example, a maximum quantity of HARQ retransmission times, and further configures, for a related HARQ entity based on the determined HARQ configuration parameter, a HARQ configuration parameter, including the maximum quantity of HARQ retransmission times, an ACK/NACK feedback time, and the like.

The HARQ entity may be a plurality of HARQ entities maintained for different services for one terminal device, and each HARQ entity includes a plurality of HARQ processes. Alternatively, the HARQ entity may be one HARQ process group of one HARQ entity maintained for one terminal device. Specifically, if HARQ processes maintained for one terminal device are grouped, different services can be mapped onto different HARQ process groups. A same HARQ configuration parameter is configured for HARQ processes in a same group.

On an uplink, an uplink signal from the terminal device is received by using the antenna 300, and is demodulated and decoded by the receiver 301 to restore service data and signaling information that are sent by the terminal device. On a downlink, service data and signaling information are modulated and encoded by the transmitter 301 to generate a downlink signal, and the downlink signal is transmitted to the terminal device by using the antenna 300. The controller/processor 302 further performs a processing process relating to the network device in FIG. 5 and/or other processes used for the technologies described in this application. The memory 303 is configured to store program code and data of the network device. Optionally, the network device further includes a communications unit 304. The communications unit 304 is configured to support communication between the network device and another network entity. For example, the communications unit 304 is configured to support communication between the network device and another communications network entity shown in FIG. 2, for example, a gateway such as a serving gateway (Serving Gateway, S-GW) and/or a PDN gateway (PDN Gateway, P-GW) in a core network, and/or the core network controller. In the embodiments of the present invention, the communications unit 304 separately receives control information and user data from a core network device. The control information includes QoS information of a service on a bearer, and the like. The bearer includes a bearer (bearer) identified by using a bearer number in a conventional LTE system or the like, and also includes a connection identified by using a connection (connection) number, a service flow (flow), or the like. One bearer may include a plurality of service flow connections. For example, a default bearer in LTE may include a plurality of service flows, or may include only one service flow connection. For example, the bearer is a bearer that is set up at a service flow granularity.

It may be understood that FIG. 3 shows merely a simplified design of the network device. In actual application, the network device may include any quantities of transmitters, receivers, processors, controllers, memories, communications units, and the like. All network devices that can implement the present invention shall fall within the protection scope of the present invention.

The terminal device may be, for example, a cellular phone, a smartphone, a portable computer, a handheld communications device, a handheld computing device, a satellite radio apparatus, a global positioning system, a palmtop computer (Personal Digital Assistant, PDA), and/or any other appropriate device. Within a given time, the network device and the terminal device may be a wireless communications transmit apparatus and/or a wireless communications receive apparatus. When sending data, the wireless communications transmit apparatus may encode the data for transmission. Specifically, the wireless communications transmit apparatus may have, for example, generate, obtain, or store in a memory, a particular quantity of information bits that are to be sent to the wireless communications receive apparatus by using a channel. The information bits may be included in one or more transport blocks of data, and the transport block may be segmented to generate a plurality of code blocks. In addition, the wireless communications transmit apparatus may encode each code block by using a polar code encoder, to improve data transmission reliability, and further ensure communication quality.

Service transmission is performed between the network device and the terminal device by using a radio interface technology. Specifically, a single-radio interface technology transmission scenario and a multi-radio interface technology transmission scenario are included.

The radio interface technology usually includes a multiple access manner, a modulation and coding scheme, a frame structure, a physical channel, a transport channel, a logical channel, Media Access Control, radio link control, the Packet Data Convergence Protocol, radio resource control, and the like. The radio interface technology may be a system using different radio interface technologies on different carriers or different time-frequency resources, or may be a system using different radio interface technologies on a same carrier or a same time-frequency resource.

In the single-radio interface technology transmission scenario, a communications system configures a same radio interface technology (air interface) for transmitting all services. For example, a same waveform or a same subframe length is set on one spectrum resource.

Figure 4:
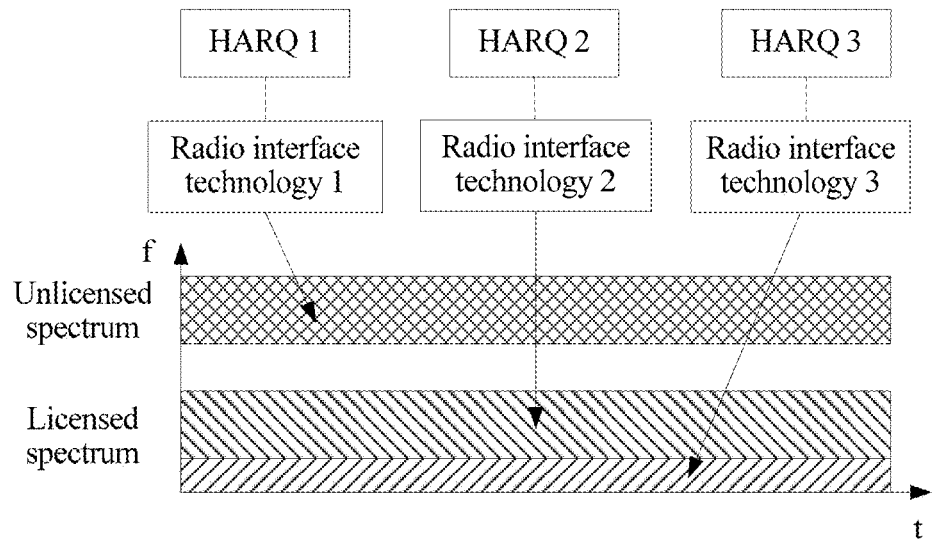
FIG. 4 is a schematic diagram of multi-radio interface technology transmission according to an embodiment of the present invention.

In the multi-radio interface technology transmission scenario, the communications system configures a plurality of radio interface technologies for transmitting different services. The configured plurality of radio interface technologies may be deployed on different resources, for example, different carriers or different time-frequency resources, or may be deployed on a same time-frequency resource. A plurality of radio interface technologies may coexist on a same time-frequency resource. For example, an eMBB service and a URLLC service coexist on same system (for example, LTE) bandwidth by separately using different modulation and coding schemes and/or different groups of logical channels. Alternatively, a plurality of radio interface technologies may coexist on different time-frequency resources. For example, a licensed spectrum and an unlicensed spectrum in licensed-assisted access (Licensed-Assisted Access, LAA) may be divided into two radio interface technologies for coexistence, and the licensed spectrum in LAA may be further divided into a plurality of subbands with different bandwidth by using a subband-based filtered-orthogonal frequency division multiplexing (Filtered-Orthogonal Frequency Division Multiplexing, F-OFDM) technology. Each subband supports one radio interface technology for coexistence. Each radio interface technology may support one type of service. For example, three radio interface technologies are respectively used to transmit three types of services: an eMBB service, an mMTC service, and a URLLC service. In addition, to support efficient utilization of a radio interface technology resource, load balancing may be performed to allocate a same type of service to different radio interface technologies for transmission. Such a scenario is similar to a scenario in which a single radio interface technology supports a plurality of services, and therefore is not described as a separate scenario. This scenario is described only for the fact that one radio interface technology is corresponding to one service. FIG. 4 describes a scenario in which three radio interface technologies coexist, and radio interface technologies are divided based on spectrum resources. Certainly, the radio interface technologies may be divided based on other information, for example, multiple access manners, modulation and coding schemes, or logical channels. A system of each radio interface technology uses a different radio interface technology. A radio interface technology 1 supports an eMBB-type service, a radio interface technology 2 supports an mMTC-type service, and a radio interface technology 3 supports a URLLC-type service. It should be noted that the plurality of radio interface technologies herein are described for radio interface technologies for bearing services. Common control information may be independently transmitted in each radio interface technology, or may be transmitted by using a common radio interface technology, to save radio interface technology resources. Service-related control information in the radio interface technologies may be multiplexed with respective services together for transmission. For a different requirement of a service borne on each radio interface technology, each radio interface technology is corresponding one HARQ configuration.

Figure 5A:
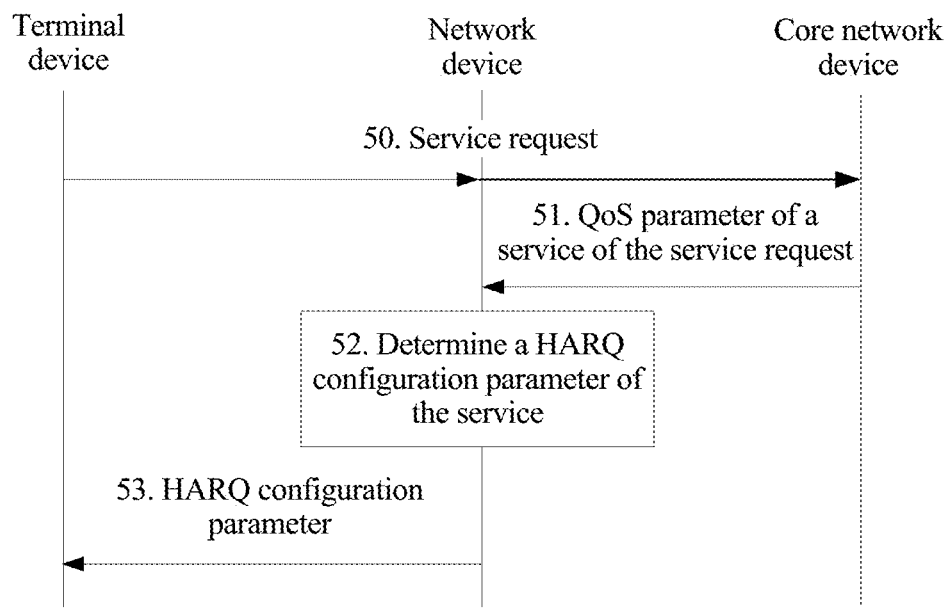
FIG. 5A, FIG. 5B, and FIG. 5C are schematic flowcharts of a HARQ-based transmission method according to an embodiment of the present invention.

As shown in FIG. 5A, an embodiment of the present invention provides a HARQ-based transmission method. A specific procedure includes the following steps:

Step 50: A terminal device sends a service request to a core network device by using a network device.

Step 51: The network device receives a QoS parameter that is of a service corresponding to the service request and that is delivered by the core network device.

Step 52: The network device determines, based on the QoS parameter of the service, a HARQ configuration parameter corresponding to the service.

Step 53: The network device notifies the HARQ configuration parameter to the terminal device.

It should be noted that the HARQ configuration parameter may include a maximum quantity of HARQ retransmission times. The HARQ configuration parameter may further include an ACK/NACK feedback time. When the network device sends data to the terminal device, the terminal device sends an acknowledgement (ACK) or a negative acknowledgement (NACK) as feedback of the data by using a physical uplink control channel (Physical Uplink Control Channel, PUCCH). If the ACK is sent, it indicates that the data is correctly sent. If the NACK is sent, it indicates that the data is incorrectly transmitted and needs to be retransmitted. Therefore, the ACK/NACK feedback time is a time for feeding back an ACK/NACK after data is sent.

It should be noted that the HARQ configuration parameter is not limited to the foregoing two parameters, and any parameter that affects a HARQ process can be referred to as the HARQ configuration parameter.

The HARQ configuration parameter may be specifically configured based on different services and radio interface technologies. For example, the ACK/NACK feedback time may be set to 4 ms conventionally, or may be set to another value, for example, 2 subframes, where subframe=0.2 ms.

Figure 5B:
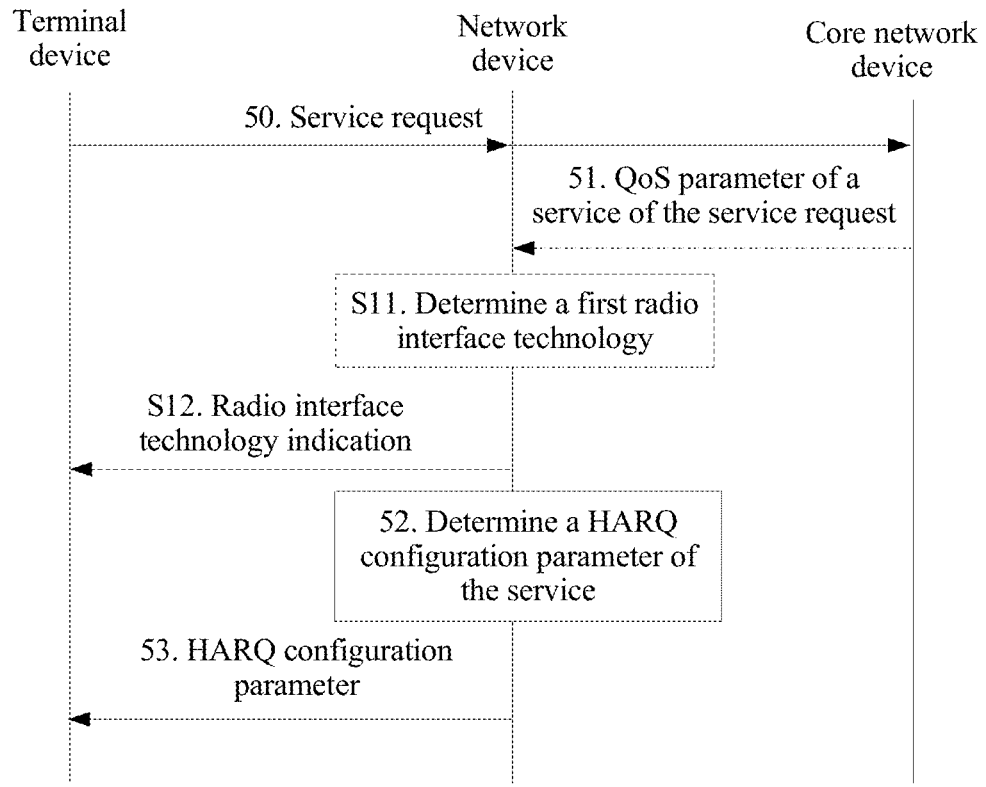
Figure 5C:
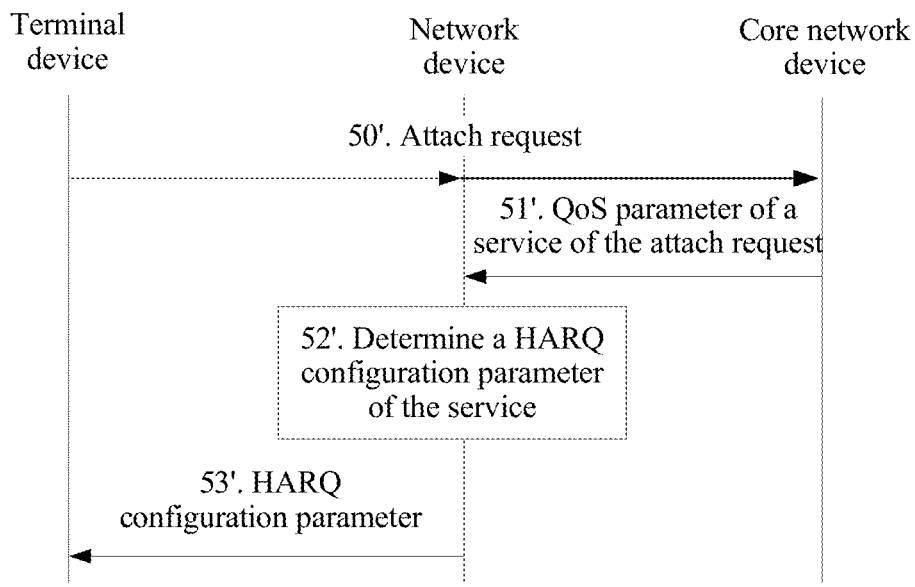

In a possible implementation, as shown in FIG. 5B, after step 51 and before step 52, the method further includes the following steps:

Step S11: The network device determines, based on the QoS parameter of the service, a first radio interface technology for bearing the service, where the first radio interface technology is one of radio interface technologies for transmission between the network device and the terminal device.

Step S12: The network device notifies the terminal device to use the first radio interface technology to transmit data corresponding to the service.

Specifically, in this implementation, when the network device determines the HARQ configuration parameter of the service, when the network device determines that no service bearer of the terminal device has been set up on the first radio interface technology, the network device determines the HARQ configuration parameter of the service based on the QoS parameter of the service; or when the network device determines that a service bearer of the terminal device has been set up on the first radio interface technology, the network device does not configure a new HARQ configuration parameter for the service.

Specifically, after the network device notifies the HARQ configuration parameter to the terminal device, the network device performs data transmission and retransmission of the service with the terminal device based on the HARQ configuration parameter. A specific process is as follows:

The network device obtains, for the terminal device, a data packet from a bearer that is the same as the HARQ configuration parameter, to perform transmission multiplexing to generate a transport block; and performs data transmission and retransmission based on the HARQ configuration parameter.

When a service bearer of the terminal device has been set up on the first radio interface technology, the terminal device skips receiving the HARQ configuration parameter.

It should be noted that the transmission method provided in FIG. 5A for the service of the service request is also applicable to a transmission process corresponding to a default service in an attach request when the terminal device initiates the attach request to the network device. A difference lies in that the attach request is substituted for the service request. For a specific process, refer to FIG. 5C. Details are not described herein.

If a same HARQ configuration parameter is set for services with different transmission requirements, transmission requirements of different services cannot be met. In the present invention, different HARQ configuration parameters are configured for different services, to meet different transmission requirements of different services. Compared with the prior art in which the HARQ configuration parameter is configured at a terminal device granularity, in the present invention, HARQ configuration is associated with a service, so that services can be processed differently at a MAC sublayer, to meet transmission requirements such as latency requirements, rate requirements, and priority requirements of different services.

Embodiment 1

Figure 6:
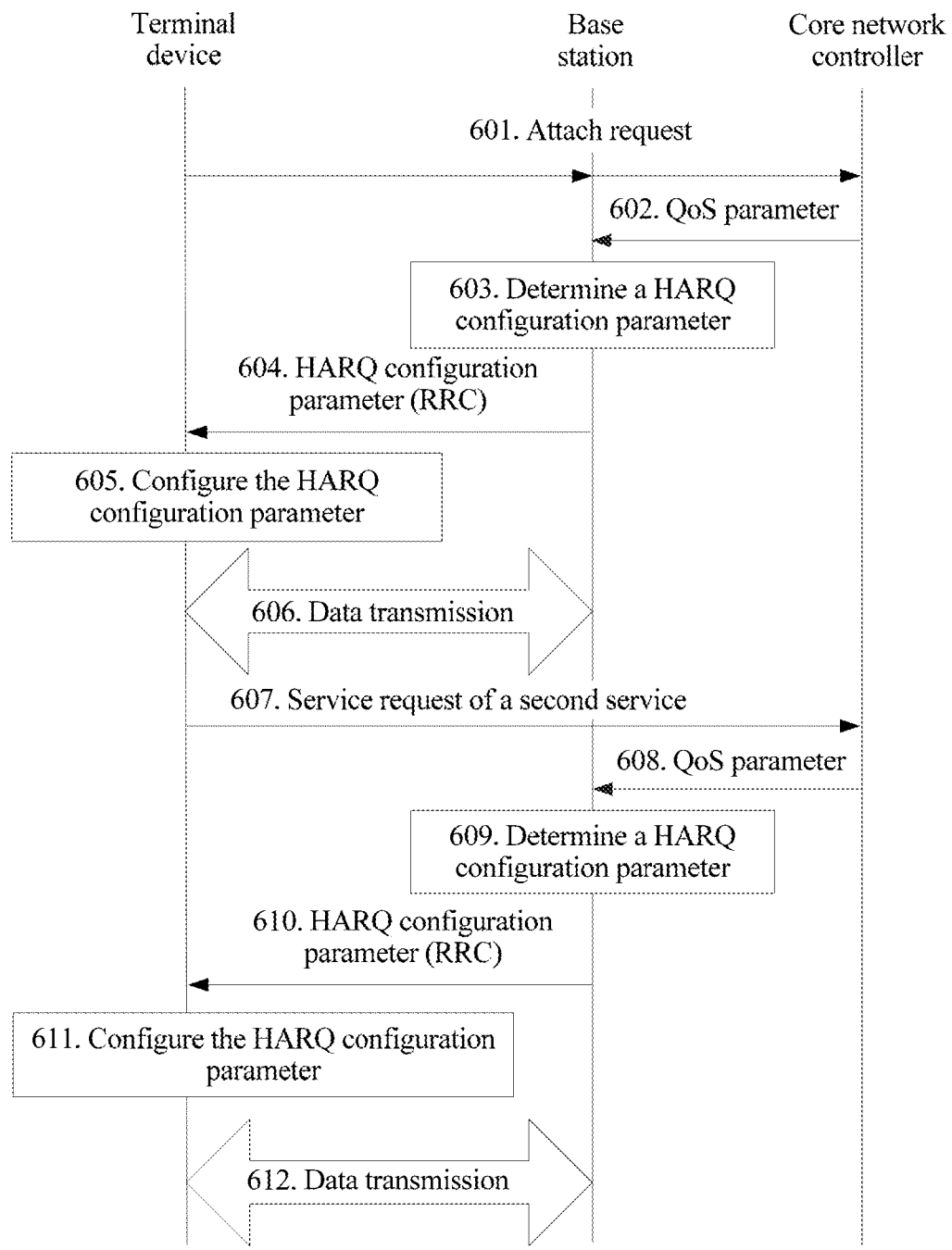
FIG. 6 is a schematic flowchart of HARQ-based transmission signaling according to Embodiment 1 of the present invention.

In this embodiment, the method in FIG. 5 is described in detail for a scenario in which service transmission is performed between a base station and a terminal device by using a single radio interface technology. In this case, all services between the network device and the terminal device are transmitted on one radio interface technology. Therefore, transmission requirements of different services are met by configuring different HARQ configuration parameters for bearers. A specific signaling procedure is shown in FIG. 6.

Step 601: A terminal device sends an attach request to a core network controller by using a base station.

Step 602: The core network controller performs service authorization for the attach request of the terminal device, to obtain a QoS parameter of a first service corresponding to the attach request; the core network controller triggers setup of an end-to-end bearer for the first service, including that the core network controller requests a core network gateway and the base station to set up a core network bearer for the first service and the core network controller also requests the base station to set up a radio bearer for the first service; and the core network controller binds the QoS parameter of the first service to the bearer, to deliver the corresponding QoS parameter to the base station.

Specifically, the QoS parameter may include at least one of parameters such as a priority, a transmission rate, a latency, reliability, and security. The delivered QoS parameter may be directly these parameters. To simplify an interface from a core network to an access network, a QoS class parameter may alternatively be delivered. To be specific, QoS parameters of services are divided into classes, for example, are divided into m classes, and each class is corresponding to a transmission requirement of one type of service.

Step 603: The base station determines, based on the QoS parameter of the first service, a HARQ configuration parameter transmitted corresponding to the first service, and performs configuration for a corresponding HARQ entity on a base station side.

Optionally, it is assumed that a QoS parameter class 1 is corresponding to a service that is sensitive to a latency and allows a bit error rate, for example, an eMBB service, and the service may be a virtual reality service. In this case, a maximum quantity of HARQ retransmission times may be set to 1, and an ACK/NACK feedback time may be set to 2 ms. It is assumed that a QoS parameter class 2 is corresponding to a service that is insensitive to a latency and has an extremely low bit error rate requirement, for example, an mMTC service, and the service may be an FTP download service. In this case, a maximum quantity of HARQ retransmission times may be set to 4, and an ACK/NACK feedback time may be set to 4 ms.

Step 604: The base station sends, to the terminal device by using a radio interface technology, the HARQ configuration parameter transmitted corresponding to the first service. Optionally, the HARQ configuration parameter may be sent by using an RRC message, for example, an RRC connection setup message, an RRC connection reconfiguration message, or an RRC connection reestablishment message.

Step 605: The terminal device sets the HARQ configuration parameter for the HARQ entity of the first service based on an indication of the base station.

Step 606: The base station and the terminal device perform data transmission and fast retransmission of the first service based on the configured HARQ configuration parameter.

When the terminal device needs to transmit a second service, a bearer setup process, namely, step 607 to step 612, is similar to the foregoing procedure, namely, step 601 to step 606. It should be noted that in step 610, a new HARQ configuration parameter is carried in an RRC connection reconfiguration message.

Step 607: The terminal device sends a service request of a second service to the core network controller by using the base station.

Step 608: The core network controller authorizes the second service of the terminal device, to obtain a QoS parameter of the second service; the core network controller triggers setup of an end-to-end bearer for the second service, including that the core network controller requests the core network gateway and the base station to set up a core network bearer for the second service and requests the base station to set up a radio bearer for the second service; and the core network controller binds the QoS parameter of the second service corresponding to the service request to the bearer, to deliver the corresponding QoS parameter to the base station.

Specifically, the QoS parameter may include at least one of parameters such as a priority, a transmission rate, a latency, reliability, and security. The delivered QoS parameter may be directly these parameters. To simplify an interface from a core network to an access network, a QoS class parameter may alternatively be delivered. To be specific, QoS parameters of services are divided into classes, for example, are divided into m classes, and each class is corresponding to a transmission requirement of one type of service.

Step 609: The base station determines, based on the QoS parameter of the second service, a HARQ configuration parameter transmitted corresponding to the second service, and performs configuration for a corresponding HARQ entity on the base station side.

Optionally, it is assumed that a QoS parameter class 1 is corresponding to a service that is sensitive to a latency and allows a bit error rate, for example, an eMBB service, and the service may be a virtual reality service. In this case, a maximum quantity of HARQ retransmission times may be set to 1, and an ACK/NACK feedback time may be set to 2 ms. It is assumed that a QoS parameter class 2 is corresponding to a service that is insensitive to a latency and has an extremely low bit error rate requirement, for example, an mMTC service, and the service may be an FTP download service. In this case, a maximum quantity of HARQ retransmission times may be set to 4, and an ACK/NACK feedback time may be set to 4 ms.

Step 610: The base station sends, to the terminal device by using the radio interface technology, the HARQ configuration parameter transmitted corresponding to the second service. Optionally, the HARQ configuration parameter may be sent by using an RRC message, for example, an RRC connection setup message, an RRC connection reconfiguration message, or an RRC connection reestablishment message.

Step 611: The terminal device sets the HARQ configuration parameter for the HARQ entity of the second service based on an indication of the base station.

Step 612: The base station and the terminal device perform data transmission and fast retransmission of the second service based on the configured HARQ configuration parameter.

This embodiment and the prior art have the following difference: In the prior art, the HARQ configuration parameter is configured at a terminal device granularity, to be specific, the terminal device needs to configure the HARQ configuration parameter only once in a bearer setup/re-setup/reconfiguration process. Therefore, a same HARQ configuration parameter is used regardless of a service type, and consequently different HARQ configuration parameters cannot be configured for different services, affecting service transmission of services with different requirements. However, in Embodiment 1 of the present invention, a bearer is newly set up for a service. Therefore, HARQ configuration parameters can be configured based on different transmission requirements of services, so that transmission requirements of different services can be met.

Embodiment 2

Figure 7:
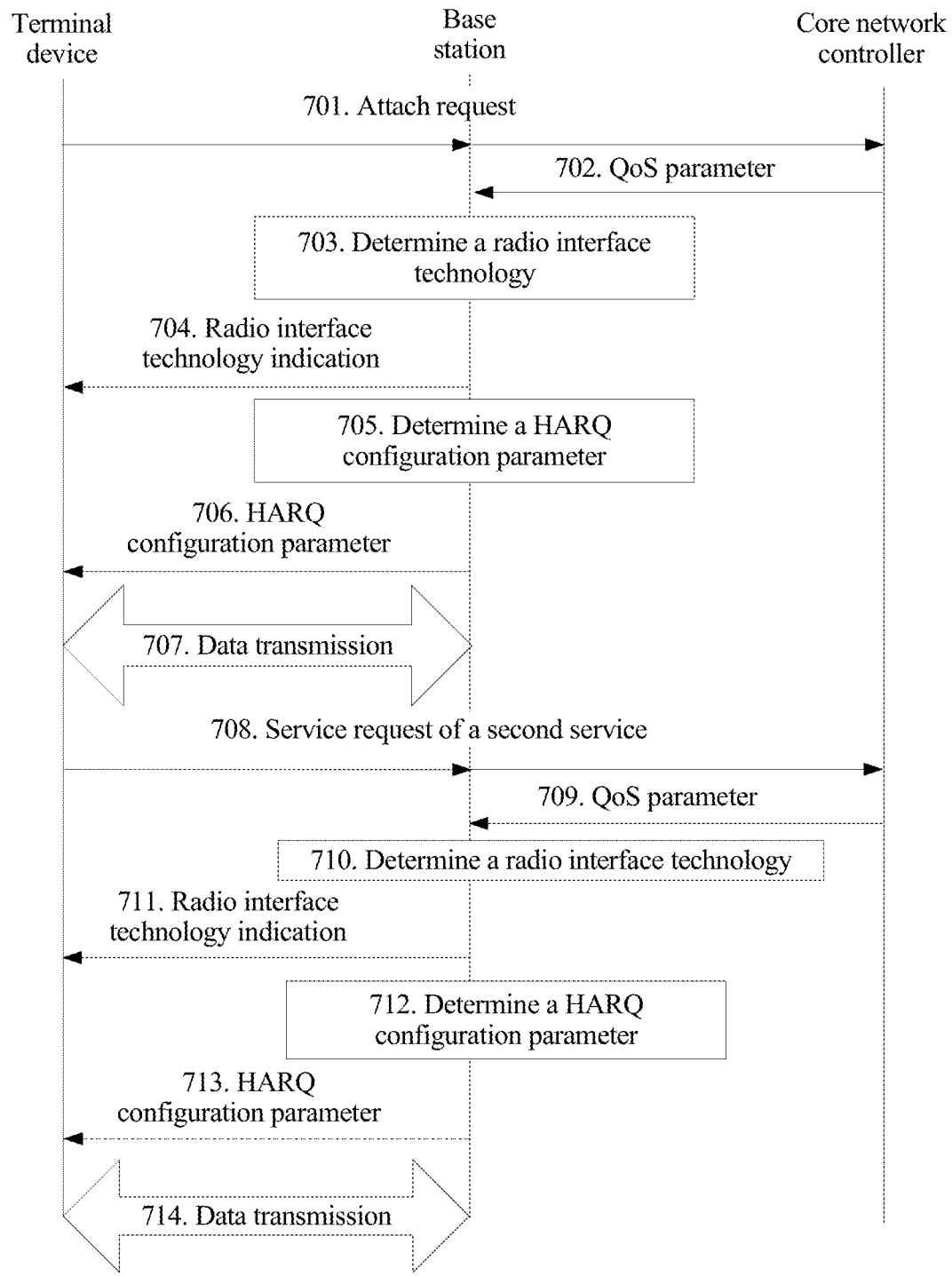
FIG. 7 is a schematic flowchart of HARQ-based transmission signaling according to Embodiment 2 of the present invention.

In this embodiment, the method in FIG. 5 is described in detail for a scenario in which service transmission is performed between a network device and a terminal device by using a plurality of air interfaces. In this case, different services between the network device and the terminal device can be borne on different radio interface technologies for transmission. Therefore, transmission requirements of different services can be met by configuring different HARQ configuration parameters for services transmitted in different radio interface technologies. Different HARQ configuration parameters are corresponding to different radio interface technologies, and therefore a HARQ configuration parameter can be indicated based on a radio interface technology in a configuration process. A specific signaling procedure may be shown in FIG. 7.

Step 701: A terminal device sends an attach request to a core network controller by using a base station.

Step 702: The core network controller performs service authorization for the attach request of the terminal device, to obtain a QoS parameter of a first service corresponding to the attach request; the core network controller triggers setup of an end-to-end bearer for the first service, including that the core network controller requests a core network gateway and the base station to set up a core network bearer for the first service and the core network controller also requests the base station to set up a radio bearer for the first service; and the core network controller binds the QoS parameter of the first service to the bearer, to deliver the QoS parameter to the base station.

Specifically, the QoS parameter may include parameters such as a priority, a transmission rate, a latency, reliability, and security. The delivered QoS parameter may be directly these parameters. To simplify an interface from a core network to an access network, a QoS class parameter may alternatively be delivered. To be specific, QoS parameters of services are divided into classes, for example, are divided into m classes, and each class is corresponding to a transmission requirement of one type of service.

Step 703: The base station determines, based on the QoS parameter of the first service, a first radio interface technology for setting up a bearer of the first service.

For example, there are three radio interface technologies for transmission between the terminal device and the base station: a radio interface technology 1, a radio interface technology 2, and a radio interface technology 3. If the base station determines, based on the QoS parameter of the first service, that the first service is an eMBB-type service, for example, a video transmission service, the base station may set up the bearer of the first service on the radio interface technology 1. If the base station determines, based on the QoS parameter of the first service, that the first service is an mMTC-type service, for example, a sensor monitoring service, the base station may set up the bearer of the first service on the radio interface technology 2. If the base station determines, based on the QoS parameter of the first service, that the first service is a URLLC-type service, for example, an in-vehicle communication service, the base station may set up the bearer of the first service on the radio interface technology 3.

Step 704: The base station sends radio interface technology indication information to the terminal device by using a common radio interface technology.

Step 705: When the base station determines that no bearer of the terminal device has been set up on the first radio interface technology, the base station determines, based on the QoS parameter of the first service, a HARQ configuration parameter transmitted corresponding to the first service, and performs configuration for a corresponding HARQ entity on a base station side.

Optionally, it is assumed that a QoS parameter class 1 is corresponding to a service that is sensitive to a latency and allows a bit error rate, for example, an eMBB service, and the service may be a virtual reality service. In this case, a maximum quantity of HARQ retransmission times may be set to 1, and an ACK/NACK feedback time may be set to 2 ms. It is assumed that a QoS parameter class 2 is corresponding to a service that is insensitive to a latency and has an extremely low bit error rate requirement, for example, an mMTC service, and the service may be an FTP download service. In this case, a maximum quantity of HARQ retransmission times may be set to 4, and an ACK/NACK feedback time may be set to 4 ms.

Step 706: The base station sends, to the terminal device, the HARQ configuration parameter transmitted corresponding to the first service. In this process, the HARQ configuration parameter may be sent by using the common radio interface technology, or may be sent by using the first radio interface technology and by using an RRC message, for example, an RRC connection setup message, an RRC connection reconfiguration message, or an RRC connection reestablishment message.

Step 707: The base station and the terminal device perform data transmission and fast retransmission for data of the first service on the corresponding first radio interface technology based on the configured HARQ configuration parameter.

When the terminal device needs to transmit a second service, a bearer setup process, namely, step 708 to step 714, is similar to the foregoing procedure, namely, step 701 to step 707.

Step 708: The terminal device sends a service request of a second service to the core network controller by using the base station.

Step 709: The core network controller authorizes the second service of the terminal device, to obtain a QoS parameter of the second service; the core network controller triggers setup of an end-to-end bearer for the second service, including that the core network controller requests the core network gateway and the base station to set up a core network bearer for the second service and requests the base station to set up a radio bearer for the second service; and the core network controller binds the QoS parameter of the second service corresponding to the service request to the bearer, to deliver the QoS parameter to the base station.

Specifically, the QoS parameter may include parameters such as a priority, a transmission rate, a latency, reliability, and security. The delivered QoS parameter may be directly these parameters. To simplify an interface from a core network to an access network, a QoS class parameter may alternatively be delivered. To be specific, QoS parameters of services are divided into classes, for example, are divided into m classes, and each class is corresponding to a transmission requirement of one type of service.

Step 710: The base station determines, based on the QoS parameter of the second service, a second radio interface technology for setting up a bearer of the second service.

For example, there are three radio interface technologies for transmission between the terminal device and the base station: a radio interface technology 1, a radio interface technology 2, and a radio interface technology 3. If the base station determines, based on the QoS parameter of the second service, that the second service is an eMBB-type service, for example, a video transmission service, the base station may set up the bearer of the second service on the radio interface technology 1. If the base station determines, based on the QoS parameter of the second service, that the second service is an mMTC-type service, for example, a sensor monitoring service, the base station may set up the bearer of the second service on the radio interface technology 2. If the base station determines, based on the QoS parameter of the second service, that the second service is a URLLC-type service, for example, an in-vehicle communication service, the base station may set up the bearer of the second service on the radio interface technology 3.

Step 711: The base station sends radio interface technology indication information to the terminal device by using the common radio interface technology.

Step 712: When the base station determines that no bearer of the terminal device has been set up on the second radio interface technology, the base station determines, based on the QoS parameter of the second service, a HARQ configuration parameter transmitted corresponding to the second service, and performs configuration for a corresponding HARQ entity on the base station side.

Optionally, it is assumed that a QoS parameter class 1 is corresponding to a service that is sensitive to a latency and allows a bit error rate, for example, an eMBB service, and the service may be a virtual reality service. In this case, a maximum quantity of HARQ retransmission times may be set to 1, and an ACK/NACK feedback time may be set to 2 ms. It is assumed that a QoS parameter class 2 is corresponding to a service that is insensitive to a latency and has an extremely low bit error rate requirement, for example, an mMTC service, and the service may be an FTP download service. In this case, a maximum quantity of HARQ retransmission times may be set to 4, and an ACK/NACK feedback time may be set to 4 ms.

Step 713: The base station sends, to the terminal device, the HARQ configuration parameter transmitted corresponding to the second service. In this process, the HARQ configuration parameter may be sent by using the common radio interface technology, or may be sent by using the first radio interface technology and by using an RRC message, for example, an RRC connection setup message, an RRC connection reconfiguration message, or an RRC connection reestablishment message.

Step 714: The base station and the terminal device perform data transmission and fast retransmission of the second service on the corresponding second radio interface technology based on the configured HARQ configuration parameter of the second service.

When a third service needs to be transmitted, the base station determines that a bearer of the terminal device has been set up on the second radio interface technology for bearing the third service, and therefore the base station performs neither step 712 nor step 713, but directly performs step 714. In this case, the base station does not configure a HARQ configuration parameter for the bearer that is of the third service and that is newly set up. In other words, a same HARQ configuration parameter is used for all services of the terminal device on a same radio interface technology.

This embodiment and the prior art have the following difference: The prior art supports bearing of different services on different radio interface technologies, but does not relate to setting of different HARQ configuration parameters for different radio interface technologies for service transmission. However, in this embodiment of the present invention, services with different transmission requirements are borne on different radio interface technologies, and different HARQ configuration parameters are configured for different radio interface technologies, so that transmission requirements of different services can be met.

Figure 8:
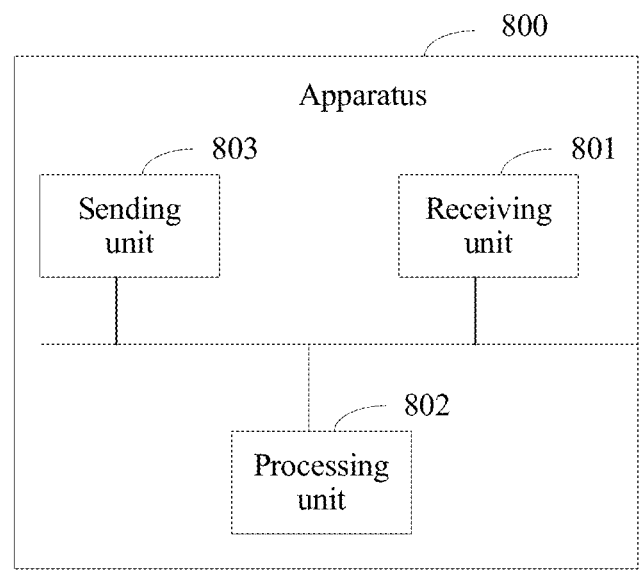
FIG. 8 is a structural diagram of a HARQ-based transmission apparatus according to an embodiment of the present invention.

Based on a same inventive concept, referring to FIG. 8, an embodiment of the present invention further provides a HARQ-based transmission apparatus 800. The apparatus 800 has a function of implementing behavior of the network device in the foregoing HARQ-based transmission method. The function may be implemented by using hardware, or may be implemented by using hardware by executing corresponding software. The hardware or the software includes one or more modules corresponding to the function.

The apparatus 800 includes a receiving unit 801, a processing unit 802, and a sending unit 803.

The receiving unit 801 is configured to receive a quality of service QoS parameter that is of a service corresponding to a service request and that is delivered by a core network device.

The processing unit 802 is configured to determine, based on the QoS parameter of the service, a HARQ configuration parameter corresponding to the service.

The sending unit 803 is configured to notify the HARQ configuration parameter to the terminal device.

Optionally, the HARQ configuration parameter includes a maximum quantity of HARQ retransmission times.

Optionally, the HARQ configuration parameter includes an ACK/NACK feedback time.

Optionally, the receiving unit 801 is further configured to:

before receiving the QoS parameter that is of the service corresponding to the service request and that is delivered by the core network device, receive the service request sent by the terminal device.

The sending unit 803 is further configured to send the service request of the terminal device to the core network device.

Optionally, the processing unit 802 is further configured to:

after the receiving unit 801 receives the QoS parameter that is of the service corresponding to the service request and that is delivered by the core network device, and before the processing unit 802 determines the HARQ configuration parameter corresponding to the service, determine, based on the QoS parameter of the service, a first radio interface technology for bearing the service.

The sending unit 803 is further configured to notify the terminal device to use the first radio interface technology to transmit data corresponding to the service.

Optionally, the processing unit 802 is further configured to:

after the sending unit notifies the HARQ configuration parameter to the terminal device, obtain, for the terminal device, a data packet from a bearer that is the same as the HARQ configuration parameter, to perform transmission multiplexing to generate a transport block; and perform data transmission and retransmission based on the HARQ configuration parameter.

Figure 9:
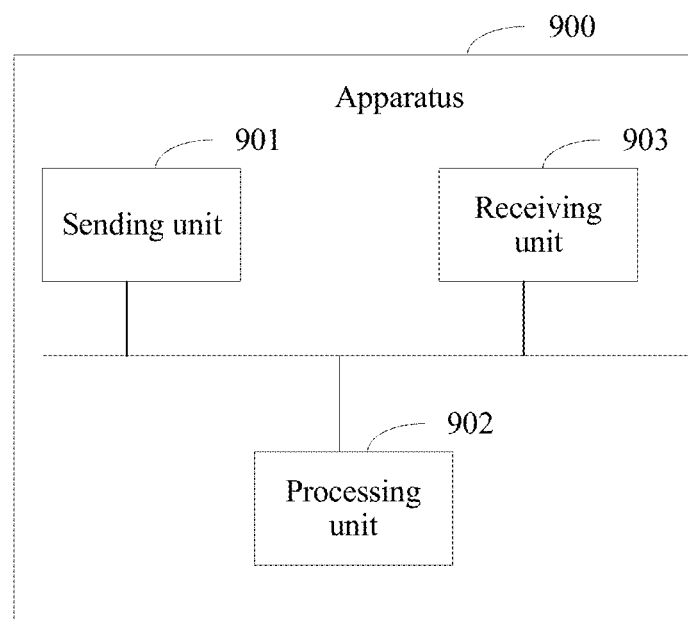
FIG. 9 is a structural diagram of a HARQ-based transmission apparatus according to an embodiment of the present invention.

Based on a same inventive concept, referring to FIG. 9, an embodiment of the present invention further provides a HARQ-based transmission apparatus 900. The apparatus 900 has a function of implementing behavior of the terminal device in the foregoing HARQ-based transmission method. The function may be implemented by using hardware, or may be implemented by using hardware by executing corresponding software. The hardware or the software includes one or more modules corresponding to the function.

The apparatus 900 includes a sending unit 901, a processing unit 902, and a receiving unit 903.

The sending unit 901 is configured to send a service request to a core network device by using a network device.

The receiving unit 903 is configured to receive a HARQ configuration parameter that is configured for a service of the service request and that is sent by the network device.

The processing unit 902 is configured to: configure the HARQ configuration parameter for the service of the service request, and perform data transmission and retransmission with the network device based on the HARQ configuration parameter.

Optionally, the receiving unit 903 is further configured to:

after the sending unit 901 sends the service request to the core network device by using the network device, and before the receiving unit 903 receives the HARQ configuration parameter that is configured for the service of the service request and that is sent by the network device, receive radio interface technology indication information sent by the network device, where the radio interface technology indication information is used to indicate a first radio interface technology that needs to be used by the terminal device to transmit the service of the service request.

Optionally, when receiving the HARQ configuration parameter that is configured for the service of the service request and that is sent by the network device, the receiving unit 903 is specifically configured to:

when no service bearer of the terminal device has been set up on the first radio interface technology, receive the HARQ configuration parameter that is configured for the service of the service request and that is sent by the network device; or when a service bearer of the terminal device has been set up on the first radio interface technology, skip receiving the HARQ configuration parameter.

Figure 10:
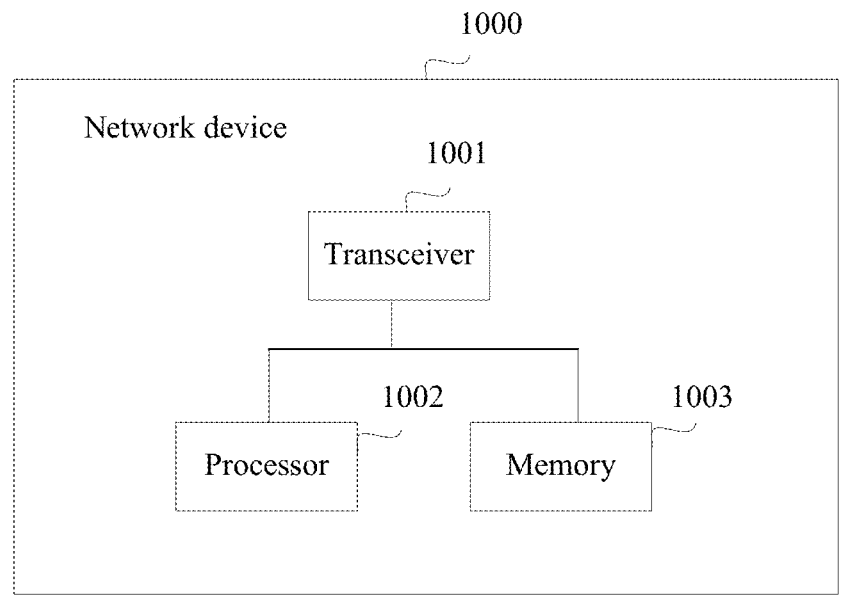
FIG. 10 is a structural diagram of a network device according to an embodiment of the present invention.

Based on a same inventive concept, referring to FIG. 10, an embodiment of this application further provides a network device 1000. The device 1000 has a function of implementing behavior of the network device in the foregoing HARQ-based transmission method. The function may be implemented by using hardware, or may be implemented by using hardware by executing corresponding software. The hardware or the software includes one or more modules corresponding to the function.

A structure of the device 1000 includes a transceiver 1001, a processor 1002, and a memory 1003. The memory 1003 is configured to store a group of programs, and the processor 1002 is configured to invoke the programs stored in the memory 1003, to perform the RM sequence application method.

It should be noted that a connection manner of all the parts shown in FIG. 10 is merely a possible example. Alternatively, the connection manner may be that both the transceiver 1001 and the memory 1003 are connected to the processor 1002, and the transceiver 1001 is not connected to the memory 1003, or may be other possible connection manners.

The processor 1002 may be a central processing unit (English: central processing unit, CPU for short), a network processor (English: network processor, NP for short), or a combination of a CPU and an NP.

The processor 1002 may further include a hardware chip. The hardware chip may be an application-specific integrated circuit (English: application-specific integrated circuit, ASIC for short), a programmable logic device (English: programmable logic device, PLD for short), or a combination thereof. The PLD may be a complex programmable logic device (English: complex programmable logic device, CPLD for short), a field programmable gate array (English: field programmable gate array, FPGA for short), generic array logic (English: generic array logic, GAL for short), or any combination thereof.

The memory 1003 may include a volatile memory (English: volatile memory) such as a random access memory (English: random access memory, RAM for short); or the memory 1003 may include a nonvolatile memory (English: nonvolatile memory) such as a flash memory (English: flash memory), a hard disk (English: hard disk drive, HDD for short), or a solid-state drive (English: solid-state drive, SSD for short); or the memory 1003 may include a combination of the foregoing types of memories.

Figure 11:
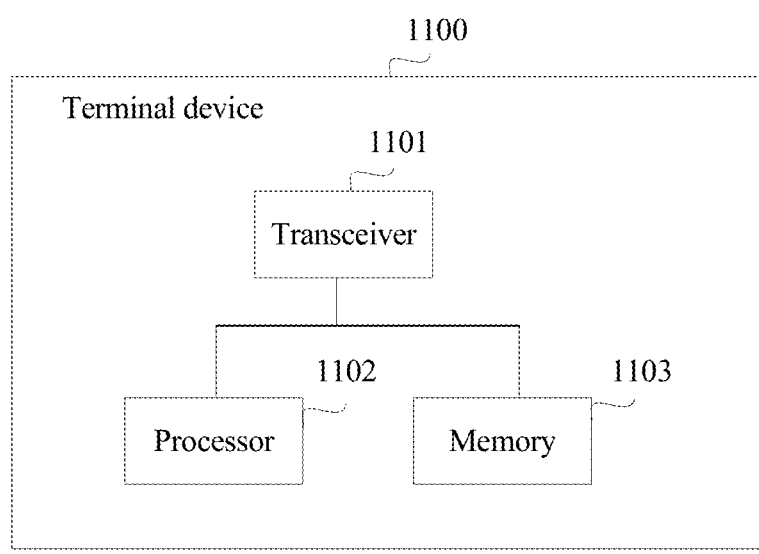
FIG. 11 is a structural diagram of a terminal device according to an embodiment of this application.

Based on a same inventive concept, referring to FIG. 11, an embodiment of this application further provides a terminal device 1100. The terminal device 1100 has a function of implementing behavior of the terminal device in the foregoing HARQ-based transmission method. The function may be implemented by using hardware, or may be implemented by using hardware by executing corresponding software. The hardware or the software includes one or more modules corresponding to the function.

A structure of the terminal device 1100 includes a transceiver 1101, a processor 1102, and a memory 1103. The memory 1103 is configured to store a group of programs, and the processor 1102 is configured to invoke the programs stored in the memory 1103, to perform the RM sequence generation method.

It should be noted that a connection manner of all the parts shown in FIG. 11 is merely a possible example. Alternatively, the connection manner may be that both the transceiver 1101 and the memory 1103 are connected to the processor 1102, and the transceiver 1101 is not connected to the memory 1103, or may be other possible connection manners.

The processor 1102 may be a central processing unit (English: central processing unit, CPU for short), a network processor (English: network processor, NP for short), or a combination of a CPU and an NP.

The processor 1102 may further include a hardware chip. The hardware chip may be an application-specific integrated circuit (English: application-specific integrated circuit, ASIC for short), a programmable logic device (English: programmable logic device, PLD for short), or a combination thereof. The PLD may be a complex programmable logic device (English: complex programmable logic device, CPLD for short), a field programmable gate array (English: field programmable gate array, FPGA for short), generic array logic (English: generic array logic, GAL for short), or any combination thereof.

The memory 1103 may include a volatile memory (English: volatile memory) such as a random access memory (English: random access memory, RAM for short); or the memory 1103 may include a nonvolatile memory (English: nonvolatile memory) such as a flash memory (English: flash memory), a hard disk (English: hard disk drive, HDD for short), or a solid-state drive (English: solid-state drive, SSD for short); or the memory 1103 may include a combination of the foregoing types of memories.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may alternatively be stored in a computer readable memory that can instruct a computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some example embodiments of the present invention have been described, persons skilled in the art can make changes and modifications to these embodiments once they learn the basic inventive concept. Therefore, the following claims are intended to be construed as to cover the example embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of the claims of the present invention and their equivalent technologies.

What is claimed is:

1. A hybrid automatic repeat request (HARQ)-based transmission method, comprising:
   receiving, by a network device, a quality of service (QoS) parameter that is of a service corresponding to a service request and that is delivered by a core network device;
   determining, by the network device based on the QoS parameter of the service, a first radio interface technology for bearing the service; and
   notifying, by the network device, a terminal device to use the first radio interface technology to transmit data corresponding to the service;
   determining, by the network device based on the QoS parameter of the service, a HARQ configuration parameter corresponding to the service, wherein the HARQ configuration parameter comprises a maximum quantity of HARQ retransmission times corresponding to the service; and
   notifying, by the network device, the HARQ configuration parameter to the terminal device.

2. The method according to claim 1, wherein the HARQ configuration parameter comprises an acknowledgement (ACK) feedback time corresponding to the service and a negative acknowledgement (NACK) feedback time corresponding to the service.

3. The method according to claim 1, wherein, before the receiving, by the network device, the QoS parameter that is of the service corresponding to the service request and that is delivered by the core network device, the method further comprises:
   receiving, by the network device, the service request sent by the terminal device; and
   sending, by the network device, the service request of the terminal device to the core network device.

4. The method according to claim 1, wherein, after the notifying, by the network device, the HARQ configuration parameter to the terminal device, the method further comprises:
   obtaining, by the network device and from the terminal device, data packets from a service bearer that is set up using the HARQ configuration parameter notified by the network device, to perform transmission multiplexing of the data packets to generate a transport block; and performing, by the network device, transmission and retransmission of the data packets based on the HARQ configuration parameter.

5. A hybrid automatic repeat request (HARQ)-based transmission method, comprising:
   sending, by a terminal device, a service request to a core network device by using a network device;
   receiving, by the terminal device, radio interface technology indication information sent by the network device, wherein the radio interface technology indication information is used to indicate a first radio interface technology that needs to be used by the terminal device to transmit a service of the service request; and
   when no service bearer of the terminal device has been set up on the first radio interface technology, receiving, by the terminal device, a HARQ configuration parameter that is configured for the service of the service request and that is sent by the network device, wherein the HARQ configuration parameter comprises a maximum quantity of HARQ retransmission times corresponding to the service of the service request, and configuring, by the terminal device, the HARQ configuration parameter for the service of the service request, and performing data transmission and retransmission with the network device based on the HARQ configuration parameter.

6. A hybrid automatic repeat request (HARQ)-based transmission apparatus, comprising:

a transmitter, wherein the transmitter is configured to send a service request to a core network device by using a network device;

a receiver, wherein the receiver is configured to receive radio interface technology indication information sent by the network device, wherein the radio interface technology indication information is used to indicate a first radio interface technology that needs to be used by a terminal device to transmit a service of the service request;

the receiver, wherein when no service bearer of the terminal device has been set up on the first radio interface technology, the receiver is configured to receive a HARQ configuration parameter that is configured for the service of the service request and that is sent by the network device, wherein the HARQ configuration parameter comprises a maximum quantity of HARQ retransmission times corresponding to the service of the service request; and at least one processor, the at least one processor configured to:

configure the HARQ configuration parameter for the service of the service request when the HARQ configuration parameter has been received by the receiver; and perform data transmission and retransmission with the network device based on the HARQ configuration parameter when the HARQ configuration parameter has been received by the receiver.

* * * * *

UNITED STATES PATENT AND TRADEMARK OFFICE
CERTIFICATE OF CORRECTION

PATENT NO. : 10,841,042 B2
APPLICATION NO. : 16/251960
DATED : November 17, 2020
INVENTOR(S) : Jinfang Zhang and Wei Zhang Page 1 of 1

It is certified that error appears in the above-identified patent and that said Letters Patent is hereby corrected as shown below:

In the Claims

In Column 25, Line 5, in Claim 5, after "request," delete "and".

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*